Aug. 6, 1957 R. S. FORD 2,801,656
UNIVERSAL WORK HOLDER FOR SAWS AND OTHER WOODWORKING MACHINES
Filed Aug. 10, 1951 2 Sheets-Sheet 2

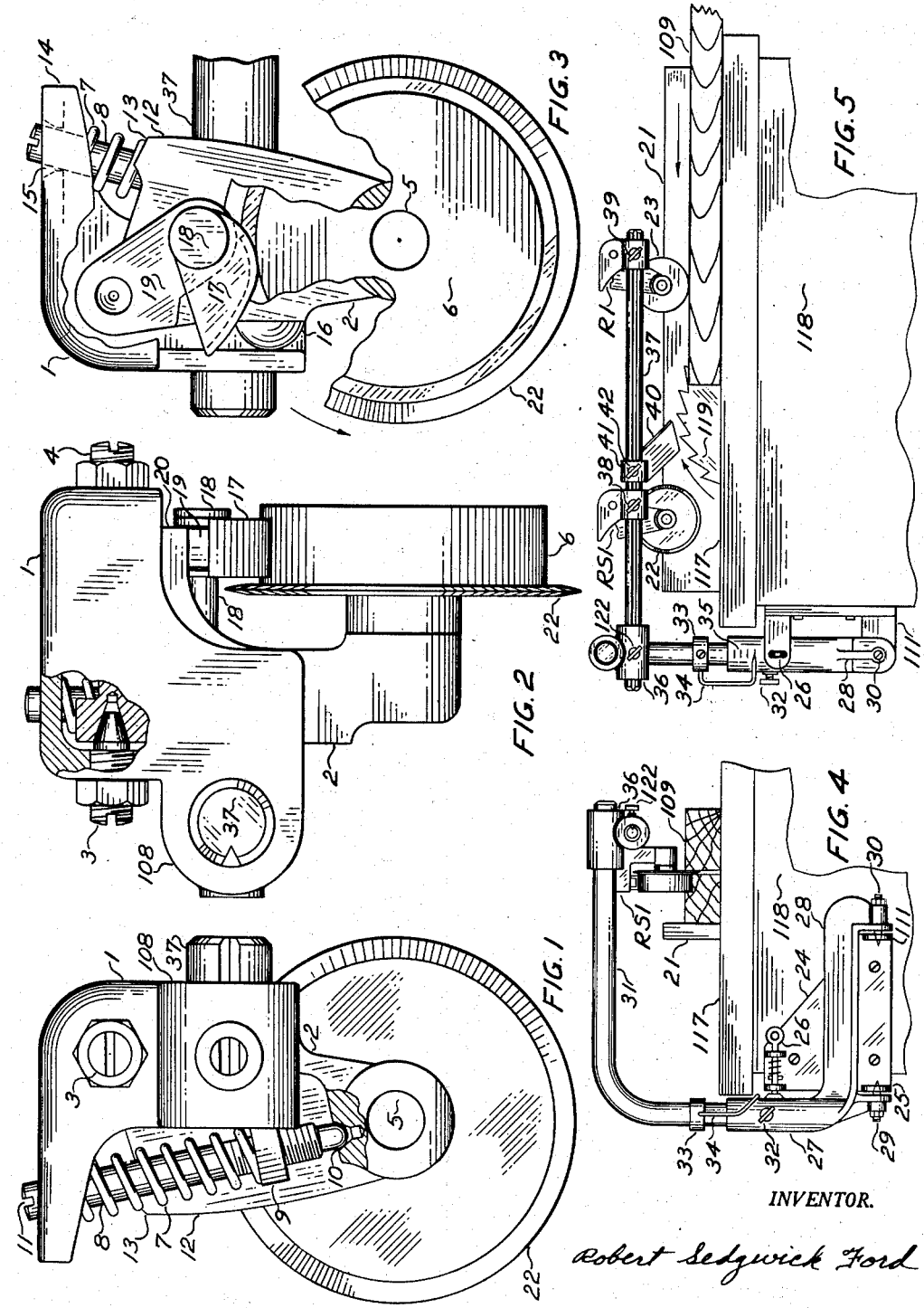

INVENTOR.
Robert Sedgwick Ford

United States Patent Office 2,801,656
Patented Aug. 6, 1957

2,801,656

UNIVERSAL WORK HOLDER FOR SAWS AND OTHER WOODWORKING MACHINES

Robert Sedgwick Ford, Pascagoula, Miss.

Application August 10, 1951, Serial No. 241,344

4 Claims. (Cl. 144—249)

My invention relates to universal work holding apparatus for use on saws and other woodworking machines whereby the workpiece may be mechanically guided against the machine table and fence throughout the cutting operation in a manner promoting speed and accuracy of operation and also safeguarding the operator.

The modern table saw machine is so versatile that it is commonly used for many operations formerly performed only on other machines such as jointers, shapers, routers, etc. This versatility coupled with the constructional differences found between saws of the various brands and models requires extreme versatility and adaptability in work holder attachments. These qualities have been achieved in the present invention to such a degree that it is not only useful for saws but for all the other commonly used woodworking machines wherein the workpieces are traversed against a machine table and fence while being cut.

Throughout this specification the side of the machine where the operator normally stands will be regarded as the "front" side, and descriptions of the other portions will be referenced from the operator's standpoint. The normal travel of the workpiece is from front to rear.

The urgent need for practical saw work holder apparatus has been known for a great many years and inventors of several generations have developed various devices intended to serve the purpose. Though the records of these early workholders are abundant in the prior art, none have found wide commercial use, as attested by the fact that at the present time the overwhelming majority of circular saws are not regularly used with work holder or related safety apparatus. Most operators remove the present so-called safety devices from their saws, for the reason that they interfere with the work and also offer very little practical safety value. It is evident that the average saw operator will seek out and use a safety device only if it improves production performance, but not for sake of safety alone. This invention has accordingly been conceived and developed with improved production performance as the paramount objective, but with safety features inherent.

The broad object may therefore be stated as to provide a universal work holder and safety apparatus which will increase the practical efficiency of the machine in addition to safeguarding the operator.

Another object is to hold the workpiece down against the table and guide it against the fence.

Still another obejct is to provide ease of workpiece entry under the pressure wheels.

A further object is to provide effective splitter means to prevent kerf closure and saw pinching.

A still further object is to provide a reliable self locking anti-kickback means.

A further object is to provide spring operated pressure wheel loading of nearly constant magnitude regardless of deflection.

A still further object is to accommodate a wide range in work dimension at each adjustment setting.

Another object is to provide suitable brackets for attachment to various machines.

In the drawings:

Fig. 1 is a left side view of the rear pressure unit.

Fig. 2 is a front view of the rear pressure unit with a section cut away to show details.

Fig. 3 is a right side view of the rear pressure unit, with sections cut away to show details.

Fig. 4 is a rear elevation of the work holder apparatus installed on a tilting table saw, showing a board being ripped.

Fig. 5 is a left side elevation of the same installation as in Fig. 4.

Figure 8:
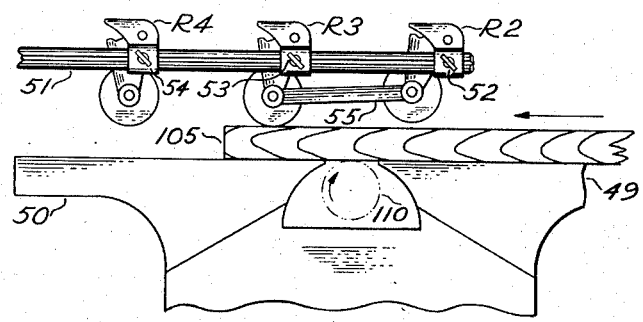
Fig. 8 is a left side elevation of the hold down apparatus installed on a jointer, with the attachment bracket omitted. The attachment bracket is assumed to be any bracket which holds the support bar rigid, as in Figs. 4 and 5 for example.

Referring to Figs. 1 through 6 it may be seen that in general the apparatus consists of spring loaded wheeled pressure units supported by grooved bars whereon they are secured by pointed thumbscrews engaging the grooves. These pressure units contain all the necessary moving parts in a compact and efficient assembly which can be positioned quickly and easily as desired to suit the individual operation. The workpieces are advanced across the machine tables manually, with the wheels rolling on the work to hold it down and guide it against the fence.

Examining Figs. 1, 2, and 3 more closely it may be noted that the type RS pressure unit contains a body 1 integral with a support socket 108, a swinging arm 2 pivoted to the bracket by nut locked taper pivot studs 3 and 4; a wheel axle 5 secured into the arm 2, and a rubber tired wheel 6 rotatably mounted on the axle 5. Spring 7 encircles rod 8 and exerts force against the square nut 9, which is threaded on the lower portion of the rod 8. The rod 8 is rounded at the lower end, and fits into a conical socket 10 in the arm 2, so that spring force against the nut 9 is transmitted through the rod 8 to the socket 10 in arm 2, whereby a resilient torque is applied to the arm 2 pivoting it downward about the axis of pivots 3 and 4, thus furnishing spring force to hold the wheel down on the workpiece. The force may be adjusted by rotating the rod 8 by means of coin slot 11 in its upper end, which screws nut 9 up or down, thus varying spring tension as desired for the work at hand. By turning the adjustment nut very high, a positive stop of variable height may be formed against the solid length of the spring. The nut 9 is prevented from rotating by its inner side abutting against a flange 12 rearwardly extending from arm 2, yet there is no interference with the swinging action of the arm since the flange surface lies in the plane of rotation. This spring arrangement permits the use of a long spring with a large amount of preloading deflection, so as to obtain a minimum variation in effective wheel pressure over the working range. A backstop pawl 17 is pivotally supported on a pin 18 through a lug 19 extended from arm 1 and through flange 12. This pawl continuously lies in contact with the rubber tire of the wheel 6, and slides freely when the wheel rotates in the infeed direction indicated by arrow in Fig. 3, but should reverse rotation begin, the pawl 17 is knuckled down by friction against the rubber tire and stops reverse rotation instantly. The pawl should be made of a hard strong material (metal preferred), and the wheel tire should be made of rubber with a high friction coefficient. The pawl working face is contoured to a form following the mathematical curve known as a logarithmic spiral, wherein the curve tangent forms a constant angle with a line drawn from the point of tangency to the polar axis. The pivot pin is concentric with the polar axis. The acute angle between the common tangent line through the point of contact with the wheel and the line from the contact point through the polar axis should be considerably greater than the critical friction angle for the material combination between wheel and pawl to insure locking action. This angle also is used as the generating angle of the spiral. Values in the range from 55 degrees to 58 degrees are usually appropriate. The line from the contact point to the pivot axis should be used as the base line in laying out the spiral. Other pawl shapes have been found functional, but the contour above described is best for the purpose. The backstop action of this combination is remarkably positive and it is also noiseless and long lasting. A very light spring may be employed to hold the pawl 17 down against the wheel, but gravity action is normally adequate. The pawl 17 is extended at the front end by a tangent section so that it may be lifted manually to permit withdrawing a workpiece after a trial cut. An extended rib 20 forms an abutment to limit upward swing of the pawl 17.

The backstop pawl thus serves to lock the wheels against reverse rotation occurring in the event of a workpiece kickback, but it is also necessary to insure sufficient downward force on the workpiece to prevent its sliding backward beneath the locked wheels. This is accomplished by the self energizing action afforded by the swinging wheel suspension. Reverse motion of the workpiece causes the locked wheel to move slightly in the reverse direction, causing the arm 2 to swing downward, thus forcing the wheel ever tighter against the workpiece, and afffording true self locking action. To reliably secure this action the design principles outlined below must be followed. Considering a reference line from the pivot axis of arm 2 through the contact point of wheel 6 on the workpiece, this line should not approach the horizontal closer than 61 degrees at the limit of the upward stroke. The minimum locking angle depends on the coefficient of friction between the wheel tread and the work surface, and this angle varies widely with different types of wood and surface conditions. Though with clean dry pine locking may occur at angles as small as 48 degrees, a limiting angle of 61 degrees has been selected to give a margin of safety against more unfavorable conditions. To limit the upward swing of arm 2 as above described, the flange 12 is extended at the upper end into an abutment 13, adapted to strike a hood-like extension 14 of the body 1, forming a limit stop. This extension 14 also acts as an abutment for the upper end of spring 7, and guides rod 8 which slides freely through hole 15.

An elastic bumper pad 16 secured to the body 1 forms a shock absorbing abutment to limit the downward travel of arm 2, against which the arm rests when not in use. Considering a reference line from the pivot axis through the wheel axle, this line should not approach the vertical closer than 8 degrees to secure the best action on mounting the workpiece. The bumper 16 is provided to limit the travel to this angle, and to quietly absorb the shock of the spring powered downward swing of the arm in returning to the inactive position.

Referring to Figs. 1, 2, 3, 4, 5, and 6 a splitter disk 22 is affixed to the rear wheel 6 on the side away from the fence 21 and located so as to run in the saw kerf. The rim of this splitter disk is beveled equally from each side to a slightly blunted edge, and projects beyond the wheel rim approximately five sixteenths of an inch all around. The bevel surface does not include the entire projecting portion, but leaves a flat annular portion approximately one eighth inch wide adjacent to the wheel rim. The flat portion of the disk is slightly thicker than the kerf cut by the saw so that when the splitter is forced into the kerf behind the saw the kerf is sprung open slightly so as to prevent the workpiece pinching in on the saw blade. The dimensions here given for the splitter projection are typical and may be varied to suit the individual service. Ordinarily spring tension is found sufficient to hold the splitter disk in the kerf, but in case of an extreme pinch on a very large board, the spring adjustment may be screwed down solid as previously mentioned, or the whole assembly may be adjusted lower to bring the upper stop into engagement to hold the splitter disk down. The tread of wheel 6 is entirely on the fence side of the splitter disk 22 so that it will not act on and hold in place the waster portion of the workpiece. This wedging open by the rotating metal disk is superior to the action of stationary splitter blades in that it avoids the heavy frictional drag and hard feeding encountered with stationary splitters. The splitter disk 22 with the hold down wheel 6 makes a very effective combination, the wheel controlling the penetration of the splitter disk and preventing a pinching workpiece from rising up and twisting which it would be likely to do if a rotary splitter disk were used alone.

Figure 6:
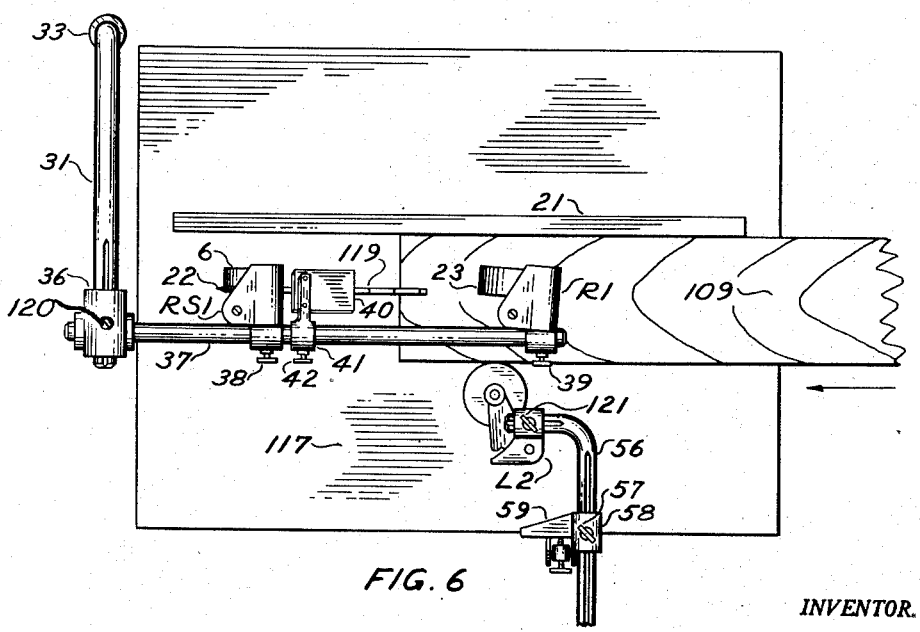
Fig. 6 is a plan view of the same installation as in Figs. 4 and 5, with the addition of the side holder assembly clamped to the table edge.

Referring to Fig. 6, it may be seen that only the rear unit RS1 contains the splitter disk, and that this unit is aligned so that the splitter disk tracks the saw blade 119 and is parallel with the fence 21. The front unit R1 contains a plain rubber tired wheel 23 without a splitter disk, having a flat tread somewhat wider than wheel 6. This front unit R1 is aligned on a skew angle so that the pivot centerline and hence the wheel axle 5 form an angle with the fence 21 on the infeed side greater than 90 degrees, preferably 91½ degrees to 93 degrees. This skewing of unit R1 serves to lead the workpiece 109 over and guide it against the fence, firstly by the moving back and aside of the wheel as it mounts the workpiece and secondly by the rolling of the wheel 23 on a slight angle toward the fence. An R type unit may be used at the rear of the saw instead of an RS type, when it is desired to omit the splitter disk. The unit R1 is similar to RS1 previously described except for the skew angle and omission of the splitter disk.

Referring to Figs. 4 and 5, the attachment bracket 24 is rigidly bolted to the rear of the saw base 118 and is fitted with rearwardly projecting lugs 25 and 111. A spring loaded barrel bolt latch 26 is also provided on bracket 24 to engage a hole in socket 27. Hinged socket 27 consists of a vertical cylindrical socket attached to a ribbed yoke 28 which embraces the lugs 25 and 111 and contains nut locked taper pivot studs 29 and 30 which engage sockets drilled in lugs 25 and 111. A grooved support bar 31 bent at right angles is carried in socket 27, and may be locked therein at any desired elevation above the table 117 by the thumbscrew 32 engaging the groove. A set collar 33, pointer 34, and graduations 35 form a means of presetting the elevation to suit the workpiece 109. Since the pressure unit wheels have a vertical spring movement range of five eighths inch, this vertical adjustment need not be accurately set. In practice it may vary more than one quarter inch either way on a given workpiece. When used with the bracket 24 attached as in Figs. 4 and 5 on a saw in which the table raises and lowers and also tilts while the saw blade remains stationary the necessity for adjusting height of the work holder to suit work thickness is entirely avoided, because the pressure units remain in a fixed relation to the saw blade and raising and lowering of the table for proper saw emergence also gives the proper space under the wheels. A further advantage with this particular type installation is that no matter how the table is tilted the splitter wheel always remains aligned with the saw blade. With tilting arbor saws the splitter must be removed to use the rear unit for bevel ripping. This is quickly done by substituting a plain wheel like 23, or by substituting an R style pressure unit at the rear position. A double socket fitting 36 with setscrew 120 and thumbscrew 122 adjustably connects grooved bars 31 and 37, and bar 37 supports pressure units R1 and RS1, which are locked in place by thumbscrews 38 and 39. Bar 37 also supports sawdust deflector 40, which is fitted with a socket 41 and thumbscrew 42 whereby it may be locked in the desired position. The deflector plate 40 should be made of rubber, so that no damage to the saw will be sustained and no hard particles thrown should the plate strike the rotating saw. The rubber plate is secured to a flanged arm extending from socket 41, and is turned aside away from the fence and downward at a slight angle to deflect flying debris aside, protecting the operator's eyes.

Referring to Figs. 4, 5, and 6, to perform ripping and similar operations on a table saw fitted with this apparatus, the pressure units are set one ahead and one behind the saw blade. The wheels are then set above the table 117 at a height slightly less than workpiece 109 thickness by use of the vertical adjustment socket 27 and locked by thumbscrew 32. The workpiece is then pushed under the front wheel 23, which swings backward and slightly sidewise as it mounts the workpiece, thus setting the workpiece over toward the fence slightly. As the workpiece is advanced, the skewed wheel axis causes it to be forced still more toward the fence, and at the same time holds it down against the table while the saw 119 is cutting it. When the workpiece reaches the rear wheel 6 the splitter 22 enters the kerf and springs it open, and the wheel 6 mounts the workpiece and holds it down. Thus the workpiece is forcibly held down, guided, and sprung open so that it may be pushed through as rapidly as the saw can cut, with no danger of ripping scant, pinching, or kickback. As the workpiece passes beyond each pressure unit in turn, the wheel drops down silently to the original position with the arm against the bumper. The workpiece should be pushed on through and out with either the next workpiece or with a push stick, to avoid bringing the hands near the saw.

For freehand ripping to a guide line the front unit R1 should be removed so as to permit hand guiding. For the many special operations such as dadoing, molding, etc., the pressure units may be moved about to apply pressure to the best advantage for the work at hand. For ripping very long planks as in lumber yards, one or more additional pressure units ahead and behind the saw may be used to advantage.

Since this apparatus is not useful in cross cutting and similar operations not employing a guide fence, it is often necessary to remove it from the machine table. This may be done quickly either by releasing barrel bolt latch 26 and tilting the apparatus backward off the table, or by releasing thumbscrew 32, and withdrawing bar 31 from socket 27 and laying the upper assembly aside. Also one or both pressure units may be removed or turned up out of the way when desired.

The sawdust deflector may be moved about as required to intercept the tangent line from the saw periphery of the operator's face, along which the sawdust is thrown. This deflector covers only the rear portion of the saw, leaving the front portion unobstructed for full visibility and measuring. Use of this deflector is advantageous in protecting the eyes and keeping sawdust from getting down the operator's collar.

Figure 7:
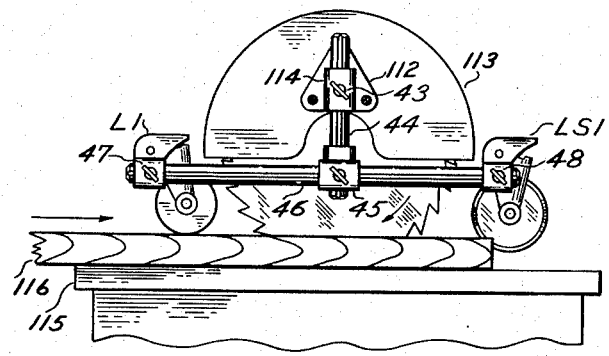
Fig. 7 is a front elevation of the hold down apparatus installed on a radial arm type saw, showing a board being ripped.

Fig. 7 shows the apparatus mounted on a radial arm saw, in which the saw blade operates above the table. In these saws the need for a good hold down and anti-kickback device is particularly great, owing to the upward cutting action being likely to throw the workpiece upward and backward. In this installation, the mounting bracket consists of a flange 112 bolted to the saw hood 113, with a socket 114 and a thumbscrew 43 supporting the grooved bar 44. This bar is engaged by a double socket fitting 45, which supports the horizontal bar 46, on which the pressure units L1 and LS1 are mounted with thumbscrews 47 and 48 as before described. These units L1 and LS1 are respectively similar to R1 and RS1 units earlier described except they are made to opposite or left hand.

The operation of this installation is analogous to that previously described for the table saw. Vertical adjustment for thickness of the workpiece 116 above the table 115 is made by means of the sliding joint formed by rod 44 and socket 114. Being attached to the saw hood, the apparatus remains lined up with the saw regardless of how the saw may be moved or tilted about for different operations. To remove the apparatus temporarily, the rod 44 is slipped out of socket 114 and the assembly laid aside. The splitter disk may be employed or not at option by using either an LS or an L type unit in the rear position. If two L units are used (no splitter) both pressure units may be rotated on the bar to remain vertical when the saw is tilted for bevel cuts.

Fig. 8 shows the pressure units installed on a jointer with a link bar between the first two units to secure proper pressure application sequence, wherein the pressure of the first unit over the front table 49 is released upon the workpiece 105 engaging the next unit over the rear table 50 beyond the cutterhead 110. The three units R2, R3, and R4 (similar to R1) are mounted on a grooved rod 51 with thumbscrews 52, 53, and 54. The link bar 55 is pivotally connected at the ends to the axles of units R2 and R3, and its effective length is slightly shorter than the distance between the pivot pins, 3 and 4 of the pressure units R2 and R3. By this means, the wheel of unit R2 is held slightly retracted when not engaging a workpiece. The spring 7 should be used in only one of units R2 or R3 but not in both to avoid doubled tension on the single wheel touching the work at a given time. The tension of one spring is made effective on both wheels by the link bar. Alternately, if two springs are used, they should both be adjusted for low tension. The support bar 51 is held rigidly by a bracket system equivalent to Figs. 4 and 5, whereby it may be adjusted both vertically and laterally to accommodate workpieces of varying thickness and width.

In operation, the row of pressure units is vertically adjusted so that the first wheel is slightly lower than the top of the workpiece, and adjusted laterally to line up the wheels with the centerline of the workpiece. The workpiece is then pushed under the first wheel, which moves upward and rearward slightly in mounting the workpiece and holding it down on the table 49. The rearward motion of the front wheel in mounting the workpiece is communicated to the second wheel by the link bar 55 and the second wheel is slightly raised thereby, but not so high as the front wheel because the front wheel was initially higher than the second wheel. Therefore when the workpiece reaches the second wheel, it pushes the wheel rearward and upward in going under it, thus causing the link bar 55 to pull the front wheel still further backward and upward, raising it from the workpiece, as illustrated in Fig. 8. During the remaining workpiece travel, the two rearmost wheels only are in action, thus holding the workpiece down on the rear table alone to generate a plane surface free from warp and twist.

On very large jointers, three pressure units to the rear of the cutterhead 110 may be employed to hold long heavy lumber. Similarly, additional pressure units over the front table may be used and interconnected with link bars or chains to the original first roller R2. Such additional front table units would be desirable only on the largest jointers in high production service. Also, instead of one row of pressure units as in Fig. 8, two or more parallel rows could be used on large jointers, since each pressure unit has individual spring action.

Referring to Fig. 6, a left hand style pressure unit L2 otherwise similar to R1 is shown acting horizontally against the edge of a workpiece. This side pressure is at times needed on saws for special operations, and is regularly needed on shapers and routers to hold the workpiece against the fence. Unit L2 is secured by thumbscrew 121 to a grooved support bar 56 held rigid in a special quick removable socket 58 wherein it is secured by a thumbscrew 57 so that it can be quickly adjusted in or out to suit the width of workpiece. It may be noted that the contact of pressure unit L2 against the workpiece is substantially to the rear of the clamp position. This arrangement is provided to cause the elastic deflection of the supporting bar 56 upon occurrence of a kickback to swing the pressure unit ever tighter against the workpiece, and also to reduce cantilever effect tending to bend the bar 56 and twist the clamp unduly. The bar 56 is bent in a vertical offset to compensate the difference in elevation between sockets 58 and 108.

To suit all the above described applications the pressure units must be made in 4 styles, namely: R (right hand with skew), L (left hand with skew), RS (right hand without skew and with splitter) and LS (left hand without skew and with splitter). As to the individual parts of these units, only the body 1 need be made in 4 different styles, namely right and left skewed and straight. Two types of wheels, namely with and without splitter, will be required. Two types of arms 2 will be required, namely right and left. All other pressure unit parts would be standardized for economical production.

I claim as my invention:
1. In a work holder apparatus for use with a work-supporting table and a guide fence, the combination of a rigid support above said table, a pivot bearing attached to the support with the axis of rotation forming an angle exceeding 90 degrees with the guide fence on the infeed side, a rearwardly depending arm swingably supported by the said pivot bearing, and a rotary presser means attached to the lower end of the arm on an axis parallel to said pivot bearing and adapted to press on the workpiece, whereby the workpiece is set over toward the guide fence as it is pushed under the presser means.

2. In a work holder apparatus, the combination of a wheel, resilient means whereby the wheel is held down on the workpiece, a rubber tire on the wheel, a backstop pawl having a working face contoured to a logarithmic spiral curve in contact with the rubber tire and a pivot pin swingably engaging a hole through the pawl coinciding with the axis of the said spiral curve, whereby the wheel is prevented from rotating in the reverse direction.

3. A combination as in claim 2 wherein the generating angle for the logarithmic spiral exceeds the critical friction angle between the pawl and the tire.

4. In a work holder apparatus, the combination of a socket adapted to be locked on a support rod, a body secured to the socket, a swinging arm pivoted to the body, a threaded rod with a rounded point resting in a socket on the arm and with the other end through a guide hold in the body, a nut threaded on the rod, a helical spring encircling the rod and applying force to the nut, means for preventing the nut from rotating when the rod is rotated to adjust spring force applied to the arm, a stop limiting the upward swing of the arm, a stop limiting the downward swing of the arm, a wheel rotatably mounted on the arm, a pawl pivoted to the arm and adapted to act as a backstop against the wheel rim, and a splitter disk coaxially secured to one side of the wheel, all adapted to forcibly hold the wheel down on a moving workpiece with the splitter engaged in a saw kerf in the workpiece and to prevent reverse motion of the workpiece.

References Cited in the file of this patent
UNITED STATES PATENTS

| | | |
|---|---|---|
| 87,700 | Pagett | Mar. 9, 1869 |
| 147,939 | Horton | Feb. 24, 1874 |
| 148,213 | Horton | Mar. 3, 1874 |
| 245,816 | Grill | Aug. 18, 1881 |
| 343,328 | Lynch | June 8, 1886 |
| 363,322 | Dwight | May 17, 1887 |
| 400,991 | Abbott | Apr. 9, 1889 |
| 448,163 | Paine | Mar. 10, 1891 |
| 604,661 | Johnston et al. | May 24, 1898 |
| 745,260 | Stuart | Nov. 24, 1903 |
| 803,736 | Winters | Nov. 7, 1905 |
| 940,016 | Hick | Nov. 16, 1909 |
| 1,007,308 | Peterman | Oct. 31, 1911 |
| 1,135,168 | Edman | Apr. 13, 1915 |
| 1,364,356 | DeKoning | Jan. 4, 1921 |
| 1,474,323 | Geibel | Nov. 13, 1923 |
| 1,744,875 | Edwards | Jan. 28, 1930 |
| 1,774,521 | Neighbour | Sept. 2, 1930 |
| 1,798,570 | Wahl | Mar. 31, 1931 |
| 1,799,944 | Beardsley | Apr. 7, 1931 |
| 1,879,211 | Hail | Sept. 27, 1932 |
| 2,007,887 | Tautz | July 9, 1935 |
| 2,034,353 | Pierson | Mar. 17, 1936 |
| 2,147,539 | Marchant | Feb. 14, 1939 |
| 2,332,888 | Bostwick et al. | Oct. 26, 1943 |
| 2,542,524 | Hobbs | Feb. 20, 1951 |
| 2,553,924 | Lillquist | May 22, 1951 |

FOREIGN PATENTS

| | | |
|---|---|---|
| 25,305 | Great Britain | Dec. 20, 1899 |
| 38,736 | Germany | Mar. 16, 1887 |